United States Patent
Bragulla et al.

(10) Patent No.: US 7,373,542 B2
(45) Date of Patent: May 13, 2008

(54) AUTOMATIC STARTUP OF A CLUSTER SYSTEM AFTER OCCURRENCE OF A RECOVERABLE ERROR

(75) Inventors: Jürgen Bragulla, München (DE); Dietmar Krauss, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 536 days.

(21) Appl. No.: 10/433,941

(22) PCT Filed: Jan. 23, 2002

(86) PCT No.: PCT/EP02/00657

§ 371 (c)(1),
(2), (4) Date: Dec. 12, 2003

(87) PCT Pub. No.: WO02/065289

PCT Pub. Date: Aug. 22, 2002

(65) Prior Publication Data

US 2004/0153704 A1    Aug. 5, 2004

(30) Foreign Application Priority Data

Feb. 9, 2001    (EP) .................................. 01103108

(51) Int. Cl.
*G06F 11/00*    (2006.01)

(52) U.S. Cl. .............................. 714/4; 714/11; 714/13; 714/15; 714/23

(58) Field of Classification Search .................... 714/4, 714/11, 13, 15, 23
See application file for complete search history.

(56) References Cited

U.S. PATENT DOCUMENTS

| 5,502,812 | A | 3/1996 | Leyre et al. | |
| 5,708,776 | A | 1/1998 | Kikinis | |
| 6,192,483 | B1 * | 2/2001 | Moiin et al. | 714/4 |
| 6,594,697 | B1 * | 7/2003 | Praitis et al. | 714/4 |
| 6,609,213 | B1 * | 8/2003 | Nguyen et al. | 714/4 |
| 6,636,982 | B1 * | 10/2003 | Rowlands | 714/4 |
| 6,766,470 | B1 * | 7/2004 | Shah | 714/4 |
| 6,857,082 | B1 * | 2/2005 | Josan et al. | 714/4 |

FOREIGN PATENT DOCUMENTS

| WO | 95/15529 | 6/1995 |
| WO | 99/05596 | 2/1999 |

OTHER PUBLICATIONS

Sun; Sun Clusters White Paper, pp. 1-33, 1997.
Sun Blueprints, pp. 1-21, 2000.

* cited by examiner

*Primary Examiner*—Robert Beausoliel
*Assistant Examiner*—Joseph D. Manoskey
(74) *Attorney, Agent, or Firm*—Bell, Boyd & Lloyd

(57) ABSTRACT

The invention relates to a method for the automatic startup of a cluster (10) after an error has occurred in a node (12, 14) of said cluster (10) that led to a reboot of the node (12, 14). The inventive method is characterized in that it automatically recognizes whether the error can be recovered and the cluster (10) can be automatically started up. The inventive method allows for the automatic return of the cluster (10) to its operation state after occurrence of an error, thereby reducing down-times of the system.

13 Claims, 2 Drawing Sheets

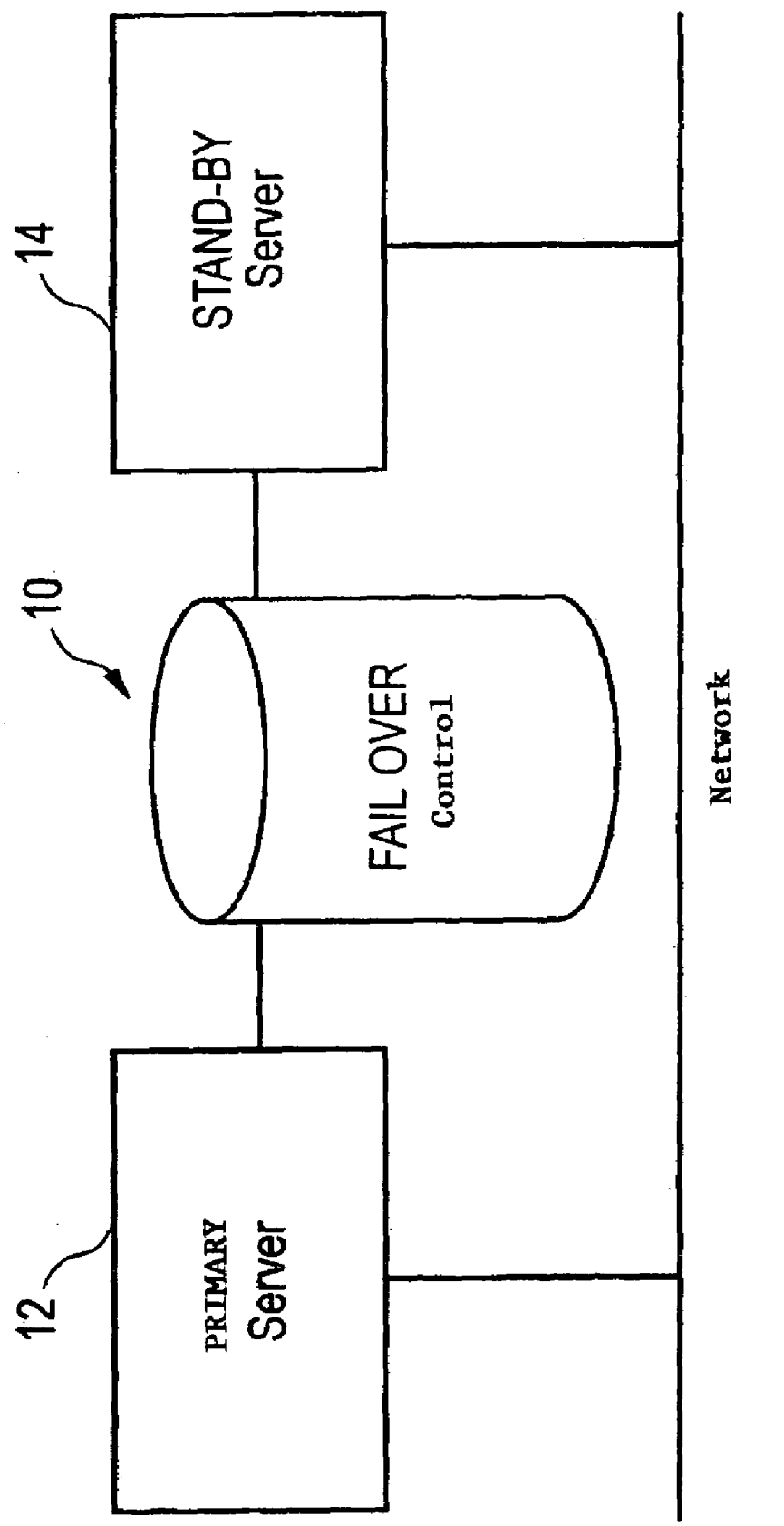

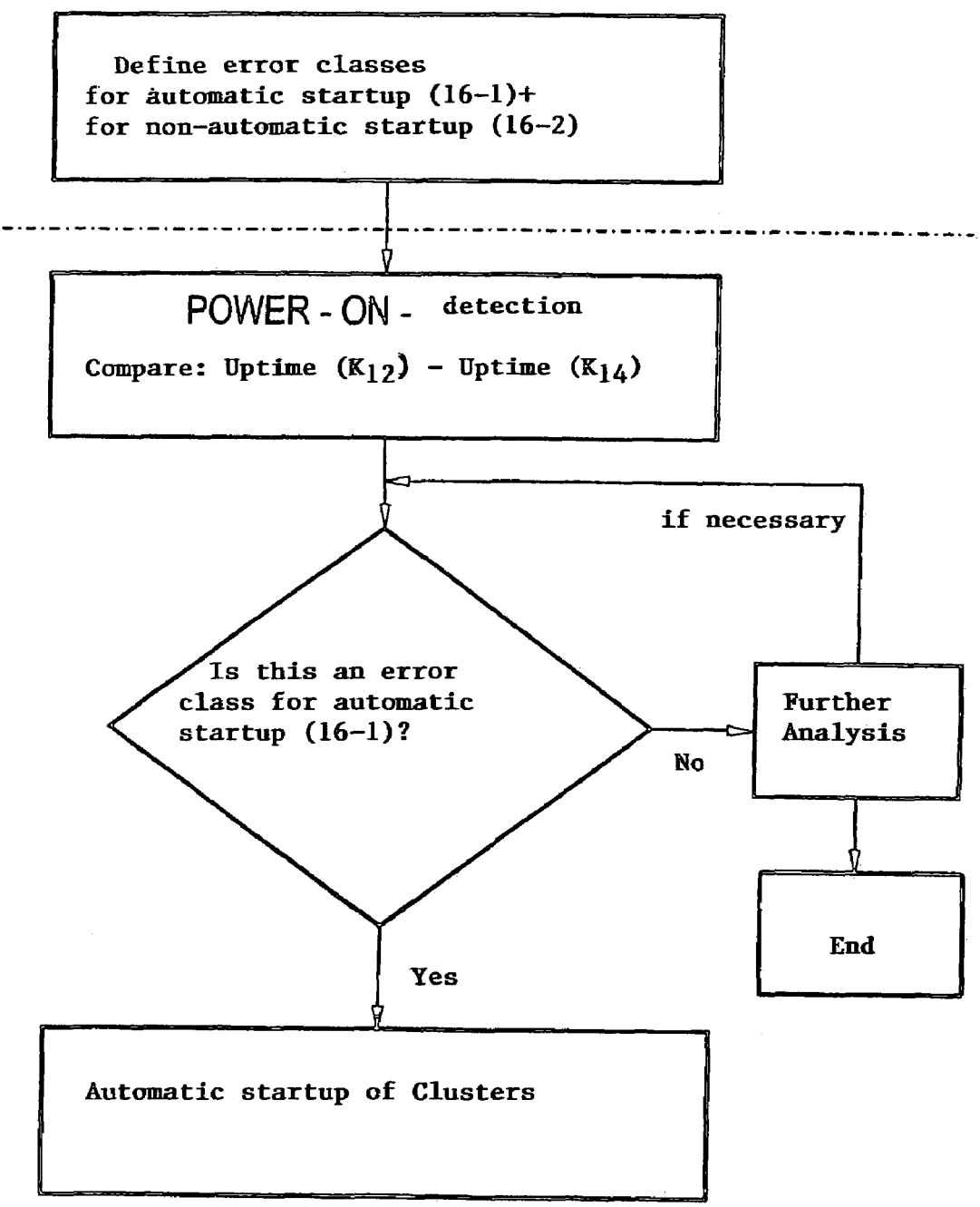

AUTOMATIC STARTUP OF A CLUSTER SYSTEM AFTER OCCURRENCE OF A RECOVERABLE ERROR

CLAIM FOR PRIORITY

This application claims priority to PCT/EP02/00657, published in the German language on Aug. 22, 2002, which claims the benefit of priority to German application no. 011 03 108.5, filed in the German language on Feb. 9, 2001.

TECHNICAL FIELD OF THE INVENTION

The invention relates to a method for starting up a cluster after an error, and in particular to high-availability systems in guaranteeing an automatic transition into an error-free operating state of the cluster after a defective node has started up.

BACKGROUND OF THE INVENTION

Basically, there are any number of different types of error which lead to a machine or a system of computers having to be started up. Since these errors have proven to be persistent, startup represents the only opportunity of rectifying it. This type of reset of a system usually requires the use of manual commands. If account is taken of the time needed to start a system manually, in particular using interactive inputs, it becomes clear that this is not viable for systems that demand high availability.

There have been efforts to automate a restart of a system. U.S. Pat. No. 5,708,776 shows, for example, a procedure for automatic restoration of the state before the error for network applications. This involved making available a first and a second reboot partition. If booting from the first partition proves not to be successful, the system will be booted from the second partition. A monitoring processor executes the software for the automatic recovery after an error in the operating system software or application software has been discovered. This document however contains no information about starting up a cluster system after a reboot. Starting up a cluster system means taking account of significantly more and more complex interdependencies of the individual nodes which is generally controlled by a cluster controller.

For systems that require maximum availability, such as carrier-grade systems in the telecommunications area of systems in healthcare and the financial sector, high-availability computer architectures have been introduced which are designed to provide maximum fault tolerance. The tests to be executed for this should be able to be executed around the clock and without interruption.

Cluster systems in particular are used for this purpose. This term includes different types of systems in which a number of autonomous machines are each networked with redundant resources and for which the use is controlled by a cluster controller.

A distinction is made between active-passive and active-active cluster architectures. With the active-passive clusters virtual pairs of machines all servers are formed in each case, in which case one server is active and offers the relevant service or executes the relevant software. If there are no errors here the other server basically operates in standby mode and takes over as quickly as possible if an error occurs.

With active-active clusters each server within the cluster takes over one task and both will operate actively in parallel. Depending on the system configurations and the intact server takes over all the tasks of the defective server if an error occurs. A better load distribution can be achieved with the active-active concept than with the active-passive architecture.

Regardless of the relevant architecture, in cluster systems a server that is still operable takes over the jobs of the defective server if an error occurs. This process is referred to as fail-over.

As well as the computer hardware, the external memory system must also be adapted to the cluster system for high-availability systems. For example, data can be stored redundantly on distributed storage to increase the security of the system. What is known as the RAID-1 System (Redundant Array of Inexpensive Disks) employs a redundancy concept that is based on the mirroring of data sets.

An important factor for all cluster systems is that they are based on an "intelligent" controller, co-ordination and communication between the individual cluster processors. The transfer protocols that are being used must be defined for example, how the individual processes to be distributed communicate with each other or by which criteria a fail-over is controlled. Another important point is that the integrity of the cluster is maintained. It must thus be guaranteed that even after a reboot of the system consistent data records are present at all nodes.

If an error now occurs in a cluster system which, although it can be rectified, is so serious that a node has to be rebooted, it was previously necessary after the reboot of the node to startup the cluster manually by entering commands.

JP 14 87 4 A2 shows, in this context, a method for maintaining operation of the cluster in which an error in a memory area of the cluster has been detected. In this case, a system controller that is set up on each node gives information about an error and directs this error message to a central point so that errors in nodes can be prevented from leading to downtime of the cluster. However, no information is given about how a cluster after a reboot caused by a wide variety the errors can automatically be restarted. Here too, a manual startup of the cluster after a reboot is necessary.

This manual process is however not viable for high-availability clusters because of the increased downtimes that it causes.

SUMMARY OF THE INVENTION

The present invention discloses a method by which an automatic, time-optimized startup of a cluster system, in particular a standby cluster, is made possible after it a reboot of a defective node caused by a recoverable error has taken place.

This task is resolved by the following method which includes:
  Determining at least a first and a second error class.
  Analysis of the error that led to a reboot of the first node
  Classification of the error into one of the error classes.
  Automatic startup of the cluster with the node if the error has been classified into the first error class.

Resolving the task includes the cluster being able independently and automatically to return to its operating state after a recoverable error in a node of the cluster which has resulted in a reboot.

In a preferred embodiment of the invention, the method is implemented with an EWSD System to which a SUN cluster is linked. EWSD (Elektronisches Wählsystem, digital—digital electronic switching system) is a public digital switching system for which over 200 million ports have already been set up in different countries.

In this exemplary embodiment, a geographically remotely set up telephone network is monitored with a central monitoring facility for errors. If a recoverable error is present which has been triggered by a software error or by an interruption of the power supply, for example, (this is classified as a temporary error which should be able to be rectified again by an automated procedure) then, in accordance with the invention, the telephone network can be put back into operation from the central point—without manual intervention on site.

An automated startup of a cluster system after a reboot produces significantly improved downtimes for the software used, in particular in the area or of applications for network operators and service providers.

In a preferred embodiment of the invention, the method is used for an automatic startup of a SUN cluster system 2.x.

A particularly advantageous embodiment of the invention relates to an active-passive cluster system which, for example, includes one or more pairs of servers, whereby one server executes a specific task that is assigned to it. The other machine is in a standby mode. If the first machine signals that problems are occurring does the second machine take over the jobs of the first. The active server in each case is therefore subject to ongoing monitoring. The active server could, for example, have failed completely because of a hardware error, the blocking of the operating system or because of an interruption to the ac power.

To increase availability and advantageously affect other system parameters active-active clusters are also often used. An alternative form of embodiment of the method in accordance with the invention is to be seen in the use of these types of architecture.

In a further advantageous embodiment of the invention "Solaris" is used as the operating system environment.

The invention is to be seen in particular as an automatic and above all dynamic generation of a startup strategy for the cluster—depending on the analysis of the preceding error that has led to a reset of the server.

BRIEF DESCRIPTION OF THE DRAWINGS

Further advantages of the invention and embodiments are shown in the figures. These show:

FIG. 1 shows a schematic diagram of a cluster system.
FIG. 2 shows a flowchart for executing the state transition in accordance with a preferred embodiment of the invention.

DETAILED DESCRIPTION OF THE INVENTION

A normal cluster architecture' as known from the state of technology' is shown below with reference to FIG. 1. In a preferred embodiment of the invention, the method for a cluster 10 is implemented that supports high-availability applications. It is in particular an active-standby cluster— these normally comprise a pair of servers that are also called nodes here. A first node 12 is defined as primary server to which specific jobs are assigned. A second note 14 is defined as standby server. In this exemplary embodiment the first node 12 has an error and is therefore also referred to as the defective node whereas the second node 14 is the intact node. Naturally it is also within the scope of the invention that the second node 14 fails and is considered as the defective node.

The second node 14 is used in the event of an error, meaning on failure of the primary server (the first or defective node 12) serves to take over its jobs and then it no longer functions as standby server but as the new primary server.

This architecture allows the downtime of the system to be minimized.

For the detection of an error state and the control of the takeover process there are a wide variety of so-called fail-over concepts.

For example, the executing software which generally only runs on a machine intended for it is here able to be run on all other nodes so that these can guarantee an error-free fail-over in the event of an error.

Of course, the method can also be used on systems that feature more complex architectures.

The nodes 12, 14 are linked to each other via a high-speed interface which is shown by the connecting lines between the two servers 12, 14 in FIG. 1.

With the aid of the method in accordance with the invention, the planned and unplanned downtimes of the system can be further minimized by cluster 10 being subjected to a reboot operation after a serious error and restarted after or during the reboot.

With reference to the flowchart shown in FIG. 2, the next paragraphs are intended to describe the steps in accordance with the invention.

The method is used, in the cases, in which the cluster system must be started up again because of a software error or because of a central power failure.

To make a distinction between these and other error classes or case groups, what is known as a power-on detection mechanism is used. In this the first and second node 12 and 14 are subjected to an analysis that especially reads out the lifetime of both nodes and takes this into consideration during further processing. What is known as the uptime of the first node 12 is compared here with the uptime of the second node 14. If the two-times match except for a specified tolerance (which defines the deviation tolerance) it can be indirectly concluded from this that a central power failure must have been involved as a result of which the system has been subjected to a reboot. The tolerance value can be determined by entering a threshold value. This can vary depending on system and application. If on the other hand for example it is recorded that the first node 12 has already been live for a number of days whereas the second node 14 was the only active for a few minutes then a central interruption of the power supply cannot have been involved.

If it is established during the power-on mechanism that the relevant uptimes deviate significantly from each other the indirect assumption of another error (e.g. hardware error, software error power failure of an individual node) so can be made. In this case, the automatic coordinated inclusion of both nodes into cluster 10 is initiated. For the subsequent startup of cluster system 10 this allows the error-free state at cluster nodes 12, 14 to be activated.

For general control of the procedure error classes 16, that are defined by specifying specific parameters, can be determined before the relevant execution of the startup procedure. This first step in the procedure can take place independently of cluster operation and can occur in advance of it. This is intended to be indicated by the dotted line shown in FIG. 2. The remaining procedure steps are undertaken during a cluster operation or during an error in cluster operation.

In the exemplary embodiment described below two error classes 16 are determined. They first error class 16-1 includes the cases in which the method for starting up the cluster is to be initiated automatically.

A second error class 16-2 includes the cases in which a further analysis of the error is to be undertaken and the procedure is to be continued manually. The first error class 16-1 is defined by the parameters "software error" and/or "central power failure". This means that the system automatically analyses the state of the system or the cause of the reboot on the basis of the error by especially investigating the uptimes of nodes 12, 14 and the result of a software error detection.

If the result is that the software error or a power failure must have occurred, the error is assigned to the first error class 16-1. It is assumed here that only a temporary error is involved that can be rectified by a reboot and a restart of the node in the cluster subject to the error. Therefore in these cases an automatic startup can take place.

In all other cases the error is classified into the second error class 16-2. It is assumed here that a serious error is involved that cannot be rectified by a reboot. Such errors typically subsume the cases of a hardware error or of a serious combined hardware and software error.

When error class 16 is determined by the administrator the cases of cluster 10 for which automatic startup is to be undertaken and those cases for which it is not to be undertaken can be set dynamically. Advantageously, this can be used to dynamically adapt the execution of the startup of cluster 10 after an error to the relevant system by for example assigning specific areas to a special error class which requires a separate startup since with automatically repeated inclusion of the faulty node into cluster 10 subsequent errors would occur.

The second error class 16 can include alternative cases in which an automatic or delayed startup is to take place in order for example to allow further error analyses to be undertaken. It can however also be defined for the second error class 16-2 that in these cases a manual startup is occurs.

In both cases of the first error class 16-1 ("temporary software error" or "central power failure") the inclusion of the two nodes 12, 14 into cluster 10 after the reboot is coordinated.

The error class-controlled procedures allow as a dynamic startup of the cluster (10) depending on the relevant current error status.

Advantageously, the boot program or boot block program and the startup procedure can be nested within each other in the startup concept presented here. This means that the booting does not necessarily have to be completed before individual steps of the cluster startup are accessed.

The Solaris operating system environment is very well suited for the use of high-availability cluster systems since it allows efficient communications with the subordinate hardware layer and furthermore supports supervision functions and is therefore a component of the preferred form of embodiment of the system in accordance with the invention.

A Solaris 2.x system can be booted in what are known as different Runlevels. The Runlevel specifies the operating mode of the computer and defines the state and the services that it provides. In particular, a distinction is made between eight Runlevels here. In Runlevel 0 (also called monitor mode) UNIX is still not running whereas in Runlevel 1 the Unix kernel is already activated. Runlevel 3 (also called multi-user mode) describes the state in which the machine already has full functionality available and in which file systems are already mounted and the network processes are running.

Advantageously, both cluster nodes can already be synchronized and automatically started up using the method in accordance with the invention after a Runlevel 3 has been reached.

The circumstance which above all contributes to the clear time optimization of the method is that assignment to the relevant error classes 16 automatically allows other cases to be detected in which an automatic startup of the cluster is possible. This allows downtime of the system to be significantly reduced, since in all cases previously defined as non-critical an immediate restart is undertaken. Until now manual restarts have had to be performed in non-critical cases as well, which resulted in a significantly longer downtime of the system.

For the startup of cluster 10 the following steps will be performed in particular.

After the first node 12 in cluster 10 has been included (for example by the command "scadmin startcluster") a check is made as to whether this step was able to be successfully performed (for example with the command "hastat"). Subsequently, this second node 14 is included with another command into cluster 10 (for example with the command "scadmin startnode"). In order to subsequently check that this step has been performed without errors (command "hastat"). after the successful inclusion of both nodes 12, 14 into cluster 10 the latter can be started. When this is done the services or applications that are to fall under the control of the cluster controller must be registered.

The individual servers or nodes 12, 14 of cluster 10 preferably exchange data with each other using what is known as a private link. This link is therefore configured redundantly to enable it to check failures of nodes 12, 14.

In an alternative embodiment of the invention, also shown in FIG. 2, each method is expanded in that, for an error assigned to error class 16-2 for which no immediate automatic restart cycle is therefore to be initiated, further analyses are undertaken. By automatically recording further parameters which allow conclusions to be drawn about the type of error, an automatic startup can also be worthwhile at a later date where necessary or the method is ended in another way.

The invention claimed is:

1. A method of starting up a cluster after an error encompassing a number of nodes in which, in the event of an error, a second node takes over jobs of a first node, comprising:
   determining at least one first and one second error class, where the first error class includes an automatic startup of the cluster;
   analyzing the error that led to a reboot of the first node;
   classifying the error into one of the error classes; and
   automatically starting-up the cluster with the nodes if the error has been classified into the first error class.

2. The method in accordance with claim 1, wherein the cluster is not started up automatically for the second error class.

3. The method in accordance with claim 1, wherein the analysis of the error includes at least power-on detection by reading out and comparing the lifetimes of the nodes.

4. The method in accordance with claim 1, wherein the cluster is a SUN cluster.

5. The method in accordance with claim 1, wherein the startup of the cluster after the reboot of the first node is undertaken when the first node has reached a state in which it has full functionality available to it, in which the network processes are running and file systems are mounted.

6. The method in accordance with claim 1, wherein the cluster is an active-active cluster.

7. The method in accordance with claim 1, wherein the cluster is an active-passive cluster.

8. The method in accordance with claim 1, wherein analysis of the error for the reboot is undertaken at two nodes assigned to each other for the cluster.

9. The method in accordance with claim 1, wherein the startup of the cluster is performed with coordinated nodes, whereby the nodes are included sequentially into the cluster each with different commands and whereby each of these inclusions is checked to ensure that it is free from errors.

10. The method in accordance with claim 6, wherein the coordination of the nodes is undertaken by determining a state of the nodes on both sides of the cluster at pre-specified coordination times.

11. A computer program product stored in memory, comprising software code sections executable by at least one processor, comprising:

determining at least one first and one second error class, where the first error class includes an automatic startup of the cluster;

analyzing the error that led to a reboot of the first node;

classifying the error into one of the error classes; and automatically starting-up the cluster with the nodes if the error has been classified into the first error class.

12. A cluster stored on a computer, the cluster performing:

determining at least one first and one second error class, where the first error class includes an automatic startup of the cluster;

analyzing the error that led to a reboot of the first node;

classifying the error into one of the error classes; and automatically starting-up the cluster with the nodes if the error has been classified into the first error class.

13. A device, comprising at least one unit to execute the following:

determining at least one first and one second error class, where the first error class includes an automatic startup of the cluster;

analyzing the error that led to a reboot of the first node;

classifying the error into one of the error classes; and automatically starting-up the cluster with the nodes if the error has been classified into the first error class.

\* \* \* \* \*